United States Patent
Kunigita et al.

(10) Patent No.: US 9,449,179 B2
(45) Date of Patent: Sep. 20, 2016

(54) INFORMATION PROCESSOR

(71) Applicant: Sony Computer Entertainment Inc., Tokyo (JP)

(72) Inventors: Hisayuki Kunigita, Kanagawa (JP); Taek-Joo Lee, Seoul (KR); Seung-Hyun Lee, Seoul (KR); Ju-Yeong Ji, Seoul (KR); He-Jin Cheong, Seoul (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 14/433,881

(22) PCT Filed: Aug. 5, 2013

(86) PCT No.: PCT/JP2013/071174
§ 371 (c)(1),
(2) Date: Apr. 7, 2015

(87) PCT Pub. No.: WO2014/061334
PCT Pub. Date: Apr. 24, 2014

(65) Prior Publication Data
US 2015/0278532 A1    Oct. 1, 2015

(30) Foreign Application Priority Data
Oct. 17, 2012 (JP) .................. 2012-230345

(51) Int. Cl.
*H04L 29/06* (2006.01)
*G06F 21/60* (2013.01)
(Continued)

(52) U.S. Cl.
CPC ............. *G06F 21/602* (2013.01); *G06F 7/588*
(2013.01); *G06F 21/10* (2013.01); *G09C 1/00*
(2013.01); *H04L 9/065* (2013.01);
(Continued)

(58) Field of Classification Search
CPC .............................. G06F 21/602; G06F 7/588
See application file for complete search history.

(56) References Cited

U.S. PATENT DOCUMENTS 6,601,140 B1 * 7/2003 Okaue ............... G06F 17/30067
707/E17.01
7,369,660 B1 * 5/2008 Kahn ..................... H04N 7/162
348/E7.056
(Continued)

FOREIGN PATENT DOCUMENTS

JP          10190649 A       7/1998
JP        2004062886 A       2/2004
(Continued)

OTHER PUBLICATIONS

Stamp, Mark. "Digital Rights Management: The Technology Behind the Hype." J. Electron. Commerce Res. 4.3 (2003): 102-112.*

(Continued)

*Primary Examiner* — Shawnchoy Rahman
(74) *Attorney, Agent, or Firm* — Matthew B. Dernier, Esq.

(57) ABSTRACT

Disclosed herein is an information processor that allows for manipulation of raw data to a certain extent with an application program while protecting the content of raw data. The information processor acquires encrypted media data, decodes the encrypted media data to generate raw data, scrambles the raw data to generate scrambled data, descrambles the scrambled data to generate the raw data, and outputs the raw data to a player.

7 Claims, 3 Drawing Sheets

(51) Int. Cl.
*G09C 1/00* (2006.01)
*H04N 21/4408* (2011.01)
*H04N 21/4405* (2011.01)
*H04L 9/06* (2006.01)
*G06F 7/58* (2006.01)
*G06F 21/10* (2013.01)

(52) U.S. Cl.
CPC ..... *H04N 21/4405* (2013.01); *H04N 21/4408* (2013.01); *G06F 2221/0735* (2013.01); *H04L 2209/60* (2013.01)

(56) References Cited

U.S. PATENT DOCUMENTS

| | | | |
|---|---|---|---|
| 8,200,961 B2 * | 6/2012 | Srinivasan | G06F 21/79 713/161 |
| 8,274,518 B2 | 9/2012 | Blythe | |
| 9,037,855 B2 | 5/2015 | Oida | |
| 2002/0002466 A1 * | 1/2002 | Kambayashi | G06F 21/10 726/27 |
| 2006/0059538 A1 * | 3/2006 | Lee | H04L 63/083 726/1 |
| 2006/0078127 A1 * | 4/2006 | Cacayorin | H04K 1/00 380/286 |
| 2006/0146057 A1 | 7/2006 | Blythe | |
| 2008/0063196 A1 | 3/2008 | Evans et al. | |
| 2008/0117679 A1 | 5/2008 | Srinivasan | |
| 2010/0037254 A1 * | 2/2010 | Gagnon | H04N 21/2389 725/31 |
| 2011/0103769 A1 | 5/2011 | Risan | |
| 2013/0132944 A1 * | 5/2013 | Davis | G06F 9/468 718/1 |
| 2014/0068253 A1 | 3/2014 | Oida | |
| 2014/0068704 A1 * | 3/2014 | Grewal | H04L 63/0428 726/1 |

FOREIGN PATENT DOCUMENTS

| | | |
|---|---|---|
| JP | 2006190281 A | 7/2006 |
| JP | 2013509643 A | 3/2013 |
| KR | 1020040000323 | 1/2004 |
| WO | 2012169111 A1 | 2/2015 |

OTHER PUBLICATIONS

International Search Report for corresponding PCT Application No. PCT/2013/071174, dated Nov. 5, 2013.

Office Action for corresponding JP Application No. 2014-541979, 5 pages, dated Oct. 27, 2015.

Koshimizu et al., Copyright protection targeting moving pictures by a neutral VMM, IPSG SIG Technical Reports 2012 (Hei 24) "5# [CD-ROM], Information Processing Society of Japan, vol. 2012-OS-123 No. 8, 13 pages, Feb. 15, 2013 (for relevancy see Office Action for corresponding JP Application No. 2014-541979, 5 pages, dated Oct. 27, 2015 cited above).

Office Action for corresponding KR Application No. 10-2015-7009266, 6 pages, dated Nov. 30, 2015.

International Search Preliminary Report on Patentability and Written Opinion for corresponding PCT Application No. PCT/2013/071174, dated Apr. 30, 2015.

* cited by examiner

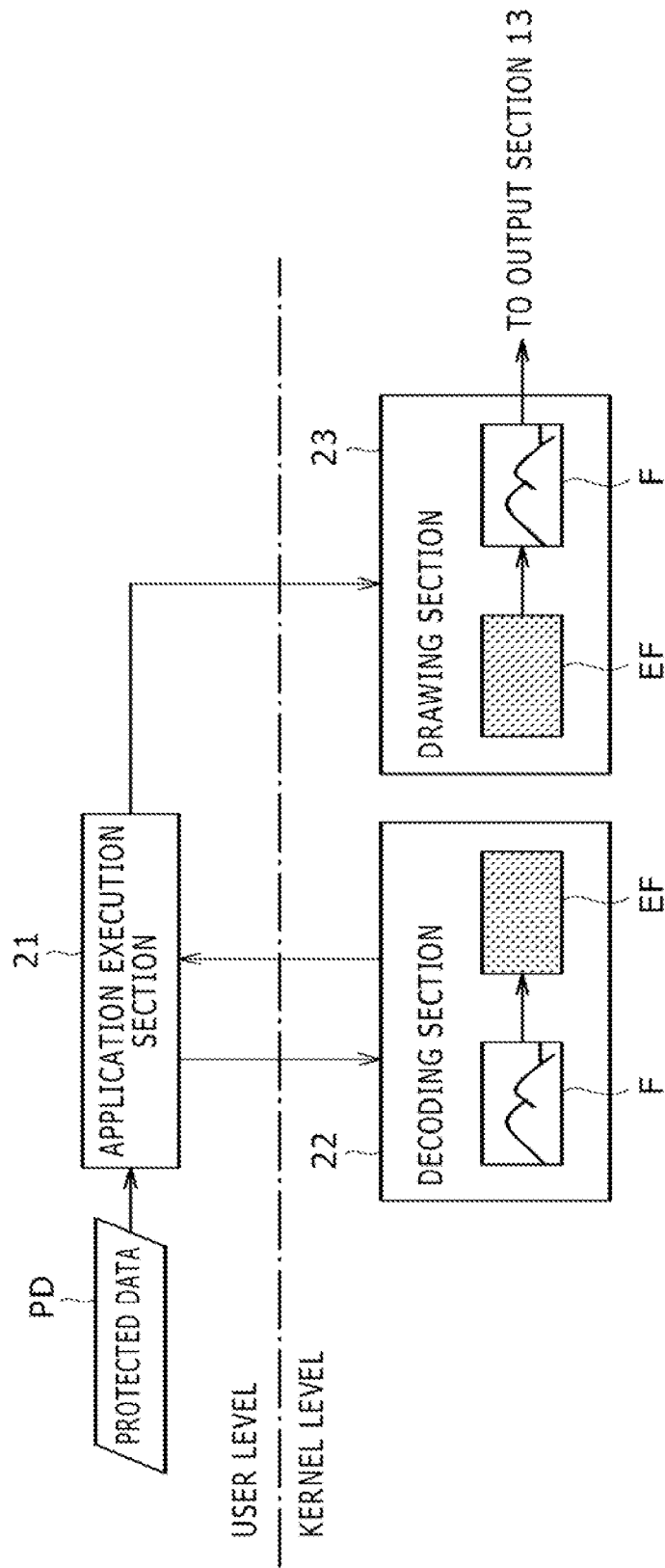

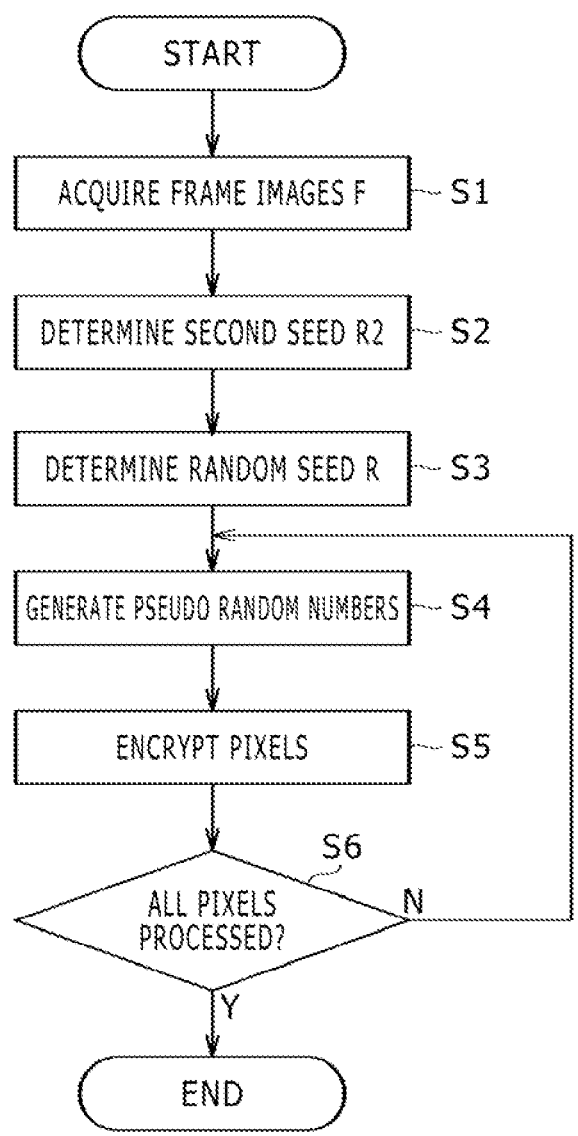

INFORMATION PROCESSOR

TECHNICAL FIELD

The present invention relates to an information processor for decoding protected media data, a control method and a control program thereof, and an information storage medium storing the program.

BACKGROUND ART

Media data including a movie and sounds are generally supplied in an encoded manner in which data size is compressed. For example, movie data is supplied after having been encoded into MPEG (Moving Picture Experts Group) or other format. On the other hand, these pieces of data are often supplied after having been encrypted by the DRM (Digital Rights Management) or other technology for protection of copyright. Such encrypted media data will be hereinafter referred to as protected data. When an information processor plays such protected data, it is necessary to decode protected data first so as to generate raw data. Here, the term "decoding" refers to decrypting encrypted protected data and decoding encoded data into original raw data. Raw data represents the movie or audio content in an as-is manner. In the case of a movie, raw data includes a plurality of continuous frame images in bitmap format. In the case of sounds, on the other hand, sampling data (e.g., PCM) obtained by sampling (quantizing) an analog audio signal corresponds to raw data.

SUMMARY

Technical Problem

As far as protected data is concerned, it is not preferred that even a user who is permitted to play that data should copy or modify raw data generated from the protected data in any way. In general, however, an application program adapted to process protected data (e.g., media player) generates raw data of media data in the course of processing protected data. For this reason, if a problem occurs including leakage of internal processing of an application program, there is a risk that raw data may be supplied to users. Among possible solutions to such a problem would be implementing a process of generating raw data from protected data and outputting raw data to a player (e.g., monitor) at the kernel level as part of the operating system. In general, a kernel level system program is protected with higher security than application programs, with its internal processing hidden from the application programs. Therefore, if such a system program generates and outputs raw data, a user cannot directly manipulate raw data. However, such implementation makes it impossible for the application programs to control media data at will, thus resulting in functional restrictions and rendering functional expansions difficult to achieve.

The present invention has been devised in light of the foregoing, and it is an object of the present invention to provide an information processor that allows for manipulation of raw data to a certain extent with an application program while protecting the content of raw data, an information processing method thereof, a program for achieving the information processing method, and an information storage medium storing the program.

Solution to Problem

An information processor according to the present invention includes an acquisition section, a decoding section, and a playing section. The acquisition section acquires encrypted media data. The decoding section decodes the encrypted media data to generate raw data, scrambles the raw data to generate scrambled data, and outputs the scrambled data. The playing section descrambles the scrambled data to generate the raw data and outputs the raw data to a player.

Further, an information processing method according to the present invention includes an acquisition step, a decoding step, and a playing step. The acquisition step acquires encrypted media data. The decoding step decodes the encrypted media data to generate raw data, scrambles the raw data to generate scrambled data, and outputs the scrambled data. The playing step descrambles the scrambled data to generate the raw data and outputs the raw data to a player.

Still further, a program according to the present invention allows a computer to function as a decoding section and a playing section. The decoding section decodes encrypted media data to generate raw data, scrambles the raw data to generate scrambled data, and outputs the scrambled data. The playing section descrambles the scrambled data to generate the raw data and outputs the raw data to a player. This program may be stored in a computer-readable information storage medium.

BRIEF DESCRIPTION OF DRAWINGS

FIG. 2 is a functional block diagram of the information processor according to the embodiment of the present invention.

FIG. 3 is a flowchart illustrating an example of scrambling performed by the information processor according to the embodiment of the present invention.

DESCRIPTION OF EMBODIMENT

Figure 1:
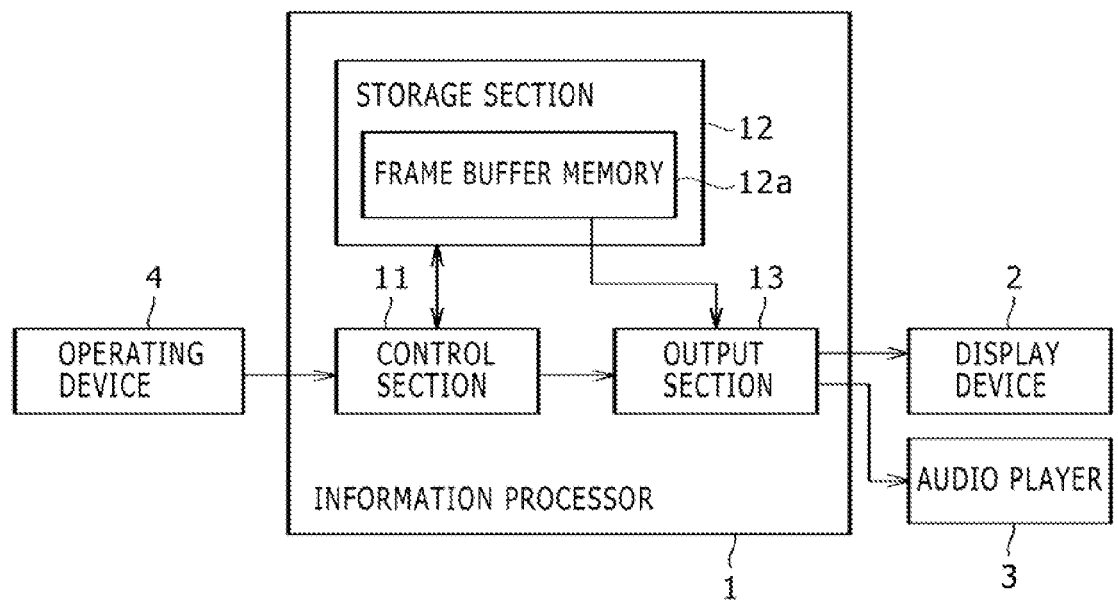
FIG. 1 is a configuration diagram of an information processor according to an embodiment of the present invention.

A detailed description will be given below of an embodiment of the present invention based on the accompanying drawings.

FIG. 1 is a configuration diagram of an information processor 1 according to an embodiment of the present invention. As illustrated in FIG. 1, the information processor 1 includes a control section 11, a storage section 12, and an output section 13. Further, the information processor 1 is connected to a display device 2, an audio player 3, and an operating device 4. The information processor 1 may be, for example, a home game console, a portable game console, a personal computer, or a smartphone.

The control section 11 is, for example, a CPU that handles a variety of information processing tasks in accordance with the program stored in the storage section 12. More specifically, the control section 11 generates protected data PD and raw data RD to be played. We assume here that protected data PD is obtained by encoding and encrypting the raw data RD of media data including a movie.

The storage section 12 includes a memory element such as RAM and stores programs executed by the control section 11 and data processed by these programs. In the present embodiment in particular, the storage section 12 stores the protected data PD to be processed. The protected data PD may be supplied to the information processor 1 via a communication network such as the Internet. Alternatively, the protected data PD may be read from a variety of information storage media such as optical disc and memory card and stored in the storage section 12. On the other hand, a frame buffer memory 12a is provided in the storage section 12 to draw a display image to be displayed on the display device 2.

The output section 13 is an interface for the display device 2 and the audio player 3. More specifically, a display image drawn in the frame buffer memory 12a is converted into a video signal and output to the display device 2 at every predetermined synchronous timing. Further, if the raw data RD includes audio data, the output section 13 outputs the audio signal generated based on this audio data to the audio player 3. The display device 2 and the audio player 3 are both kinds of players adapted to play media data. The display device 2 is, for example, a liquid crystal display device that displays a movie in accordance with the video signal output from the output section 13. On the other hand, the audio player 3 is, for example, a speaker that plays sounds in accordance with the audio signal output from the output section 13.

The operating device 4 is, for example, a controller of a home game console or a keyboard and accepts an operation input from a user and outputs the input to the information processor 1. It should be noted that any of the display device 2, the audio player 3, and the operating device 4 may be integral with the information processor 1.

A description will be given below of the functions achieved by the information processor 1 using the functional block diagram shown in FIG. 2. As illustrated in FIG. 2, the information processor 1 functionally includes an application execution section 21, a decoding section 22, and a drawing section 23. The application execution section 21 is implemented as a result of the execution of an application program by the control section 11. The decoding section 22 and the drawing section 23 are implemented as a result of the execution of a kernel level program included in the operating system program by the control section 11. Each of the programs implementing these functions may be stored in one of a variety of information storage media such as optical disc and supplied to the information processor 1. Alternatively, these programs may be supplied to the information processor 1 via a communication network such as the Internet. It should be noted that the functions achieved by the decoding section 22 and the drawing section 23 are called from an application program, for example, by API (Application Program Interface). The details of internal processing thereof are hidden from user level application programs. Further, the memory space used by the decoding section 22 and the drawing section 23 to temporarily store data for internal processing is protected from the application execution section 21 to prevent reference.

The application execution section 21 is implemented as a result of the execution of an application program such as media player by the control section 11. The application execution section 21 acquires the protected data PD and instructs the decoding section 22 to handle decoding thereof.

The decoding section 22 decodes the protected data PD to generate the raw data RD. In the present embodiment, the decoding section 22 not only performs decoding but also scrambles the raw data RD into a form that cannot be identified by a human. Scrambling is a kind of encryption adapted to reversibly convert the raw data RD into data different from its original data. The scrambled raw data RD will be hereinafter referred to as scrambled data SD. Each of a plurality of frame images F making up the raw data RD is scrambled. In the description given below, an image obtained by scrambling the frame image F will be hereinafter referred to as an encrypted frame image EF. The decoding section 22 does not output the raw data RD itself, obtained as a result of decoding, to a memory that can be referenced by the application execution section 21. Instead, the decoding section 22 outputs the scrambled data SD, obtained as a result of scrambling of the raw data RD, to a memory that can be referenced by the application execution section 21. It should be noted that the details of scrambling will be described later.

The application execution section 21 further performs a process adapted to play the raw data RD using the scrambled data SD generated by the decoding section 22. For example, the application execution section 21 may paste the frame image F included in the raw data RD to an object arranged in a 3D space as a texture rather than displaying the frame image F on the screen of the display device 2 in an as-is manner. In this case, the application execution section 21 arranges the object in the 3D space to determine the display position of the frame image F and the manner in which the frame image F is displayed on the screen. At this time, the application execution section 21 does not need to actually draw the frame image F in the 3D space. Instead, the application execution section 21 causes the drawing section 23 (described later) to draw the frame image F. After performing necessary processes, the application execution section 21 instructs the drawing section 23 to play the scrambled data SD.

Upon receipt of a playing instruction from the application execution section 21, the drawing section 23 descrambles the scrambled data SD to regenerate the original raw data RD. Then, the drawing section 23 draws the frame images F making up the raw data RD and writes the display image to be displayed on the screen of the display device 2 to the frame buffer memory 12a. This display image written to the frame buffer memory 12a is converted into a video signal and displayed on the screen of the display device 2. This allows the user to view the movie included in the protected data PD. The raw data RD generated by the drawing section 23 is directly output to the display device 2 via the output section 13. As a result, the application programs cannot access the raw data RD generated by the image processing section 23.

A detailed description will be given below of scrambling. The decoding section 22 performs the following processes on each of the frame images F included in the raw data RD. That is, the decoding section 22 generates a pseudo random number sequence using a predetermined random number generation function. Then, the decoding section 22 encrypts the frame images F to be processed on a pixel-by-pixel basis using the random numbers, included in the pseudo random number sequence, one after another.

In order to generate a pseudo random number sequence using a random number generation function, it is necessary to input a random seed. In the present embodiment, a first seed R1 and a second seed R2 are used in combination as a random seed R. The first seed R1 is a fixed value made available in the information processor 1 in advance. The first seed R1 is hidden from the application programs and managed as secret information. If the first seed R1 is managed as a secret, it is impossible to know the random seed used for scrambling from the user level application programs. As a result, the scrambled data SD cannot be descrambled.

The second seed R2 is a value appropriate to attribute information of the frame image F to be processed. It is preferred that the second seed R2 should be different for each of the frame images F to be processed. This makes it possible to change the random seed R for each of the frame images F and makes it more difficult to analyze the details of scrambling than if the same random seed continues to be used. Frame image attribute information may be, for example, a time stamp of the frame image F. This time stamp is information indicating when the frame image F is to be displayed in a movie (e.g., information indicating in how many msec from the start the frame image F is to be displayed). Alternatively, attribute information of the frame image F may be a frame number that indicates what number frame image the frame image F in question is in the movie. Still alternatively, attribute information of the frame image F may be a hash value obtained by calculation from the image data of the frame image F.

The encryption scheme used by the decoding section 22 for scrambling must ensure that input and output data sizes are the same. If the frame image F is encrypted on a pixel-by-pixel basis using such an encryption scheme, a generated encrypted frame image EF is image data in bitmap format as with the frame images F included in the raw data RD. However, data of each pixel is encrypted. Therefore, the encrypted frame image EF is completely different from the original frame image F, and the content thereof is not identifiable to human eyes. Among such encryption schemes is calculating the exclusive logical sum of a pseudo random number and pixel data. Alternatively, an encryption algorithm such as RC4 or RC6 may be used.

A description will be given below of the flow of scrambling of the frame image F with reference to the flowchart shown in FIG. 3. First, the decoding section 22 acquires the frame image F to be processed (S1). Next, the decoding section 22 determines the second seed R2 from attribute information of the frame image F acquired in S1 (S2). Further, the decoding section 22 combines the second seed R2 determined in S2 with the first seed R1 made available in advance, thus determining the random seed R (S3).

Next, the decoding section 22 inputs the random seed R determined in S3 to the random number generation function, thus generating a pseudo random number (S4). Then, the decoding section 22 encrypts the image data to be processed in the frame image F using the pseudo random number generated in S4 (S5).

Then, the decoding section 22 determines whether or not all the pixels of the frame image F have been encrypted (S6). If any of the pixels of the frame image F has yet to be encrypted, the decoding section 22 returns to S4 to generate a new pseudo random number and encrypt the pixel that has yet to be encrypted. As described above, the pseudo random numbers, generated one after another using the same random seed R, are applied to each of the pixels of the frame image F for encryption. When all the pixels have been encrypted, the encrypted frame image EF is complete. Therefore, the decoding section 22 terminates the process and proceeds with the same process for the next frame image F. At this time, the frame image F to be processed has changed. Therefore, the random seed R takes on a different value from the previous one.

The drawing section 23 reverses the encryption scheme used for scrambling to generate the original frame image F from the encrypted frame image EF. At this time, the drawing section 23 can obtain the pseudo random number sequence which is completely the same as that used for scrambling by using the same random seed R and the random number generation function as used for scrambling. The drawing section 23 can generate the original frame image F through descrambling by using this pseudo random number sequence. It should be noted that the first seed R1 included in the random seed R is stored in advance in the information processor 1. Therefore, the drawing section 23 can acquire the first seed R1 as does the decoding section 22. If the second seed R2 is the time stamp or frame number of the frame image F, the drawing section 23 can acquire the second seed R2 as does the decoding section 22. Alternatively, the decoding section 22 may output the generated encrypted frame image EF with the second seed R2, used for scrambling of the frame image F, attached to the encrypted frame image EF. The drawing section 23 can acquire the random seed R used for scrambling by acquiring the second seed R2 attached to the encrypted frame image EF by the decoding section 22. In particular, if a hash value is used as the second seed R2, it is difficult to regenerate the hash value for the original frame image F from the encrypted frame image EF. Therefore, it is necessary to use such a technique.

In the information processor 1 according to the embodiment described above, the raw data RD itself is generated by the decoding section 22 and the drawing section 23 at the kernel level and hidden from application programs. This makes it difficult for application programs to copy or modify the raw data RD. The decoding section 22 outputs the scrambled data SD once that has been scrambled as a result of decoding. The scrambled data SD is in the same format as the raw data RD. Therefore, the application execution section 21 in the present embodiment can handle the scrambled data SD as conventional application program do the raw data RD. Therefore, it is possible to implement the application execution section 21 in the present embodiment without significantly modifying the existing application programs. Further, the application execution section 21 may output, to the drawing section 23, a variety of editing instructions of the images together with the encrypted frame image EF. Among specific examples of such editing instructions are enlarging, reducing, and rotating the image, and texture mapping adapted to attach the image to a 3D object. Upon receipt of such an instruction, the drawing section 23 generates the original frame image F by descrambling the encrypted frame image EF first, and then performs the instructed image processing on the generated frame image F. As a result, the application execution section 21 can display, on the display device 2, the content of the raw data RD in a manner in which the frame image F has been processed in various ways to the extent possible by the image drawing function achieved by the drawing section 23.

It should be noted that the present invention is not limited to the above described embodiment. In the above description, for example, the protected data PD includes a movie, and the decoding section 22 scrambles the frame image F included in the raw data RD of the movie. However, the protected data PD to be processed may include sounds, and the decoding section 22 may scramble audio data included in the raw data RD. Also in this case, the decoding section 22 performs encryption in predetermined data processing units using pseudo random numbers generated with a random number generation function, thus generating the scrambled data SD. The scrambled data SD generated as described above is in the same format as the raw data RD. However, the scrambled data SD is sounds that are meaningless for a human when heard in an as-is manner.

On the other hand, if an application program uses, for example, a texture image generated by a technology such as mipmap, it is only necessary to perform a process as described below. That is, when the decoding section 22 performs decoding, a texture image is generated based on the frame image F included in the raw data RD in response to a request from the application execution section 21, followed by scrambling of this texture image. The encrypted texture image generated as described above is output from the decoding section 22 and referenced by the application execution section 21. The encrypted texture image referenced by the application execution section 21 has been scrambled. Therefore, even when seen by the user, the content of data cannot be identified. Then, the application execution section 21 specifies, to the drawing section 23, parameters such as coordinates of the position to which to attach the encrypted texture image, thus instructing the drawing section 23 to draw a display image to be displayed on the screen of the display device 2. In response to the drawing instruction, the drawing section 23 descrambles the encrypted texture image first, thus generating the original texture image. Then, the drawing section 23 performs rendering adapted to draw a display image representing the state of the 3D space in the frame buffer memory 12a, for example, by mapping the generated texture image to a 3D object in accordance with the parameters specified by the application execution section 21. As a result, a display image is displayed on the display device 2. The content of the movie included in the original raw data RD is attached to the display image as a texture. As described above, by adding a process of generating a texture image from the frame image F between decoding and scrambling, it is possible to hide the content of the frame image F from user-level application programs even if the frame image F is converted into a texture image.

The invention claimed is:

1. A user information processor comprising:
   an acquisition section adapted to acquire encrypted media data from a content source using an application program executed at a user level;
   a decoding section adapted to decode the encrypted media data to generate raw data using a kernel level program whose internal processing is hidden from the application program, and perform scrambling to encrypt the raw data so as to generate scrambled data that is referenced by the application program; and
   a playing section adapted to perform descrambling to descramble the scrambled data and generate the raw data using the kernel level program, and output the raw data to a player,
   wherein the user level application program and the kernel level program are executed on the same user information processor.

2. The information processor of claim 1, wherein
   the decoding section inputs a random seed to a predetermined random number generation function to generate a random number and performs the scrambling using the generated random number, and
   the playing section inputs the random seed used for the scrambling to the predetermined random number generation function to generate a random number and performs the descrambling using the generated random number.

3. The information processor of claim 2, wherein
   the raw data is movie data made up of a plurality of frame images, and
   the decoding section scrambles each of the plurality of frame images as an image to be processed using a random seed that includes a value appropriate to attribute information of the frame image.

4. The information processor of claim 3, wherein the random seed is a combination of a value appropriate to the frame image attribute information to be processed and a fixed value stored in advance in the information processor.

5. A user information processing method, comprising:
   acquiring encrypted media data from a content source using an application program executed at a user level on a user information processor;
   decoding the encrypted media data to generate raw data using a kernel level program whose internal processing is hidden from the application program, performing scrambling to encrypt the raw data so as to generate scrambled data that is referenced by the application program, and outputting the scrambled data; and
   descrambling the scrambled data to generate the raw data using the kernel level program and outputting the raw data to a player,
   wherein the user level application program and the kernel level program are executed on the same user information processor.

6. An apparatus, comprising a computer and a non-transitory, computer readable storage medium containing a kernel level program whose internal processing is hidden from an application program executed at a user level, the kernel level program including instructions for the computer, which when executed causes the computer to carry out actions, comprising:
   decoding encrypted media data to generate raw data, scrambling the raw data to generate scrambled data that is referenced by the application program, and outputting the scrambled data; and
   descrambling the scrambled data to generate the raw data and output the raw data to a player,
   wherein the user level application program and the kernel level program are executed on the same user information processor.

7. A non-transitory, computer-readable information storage medium storing a kernel level program whose internal processing is hidden from an application program executed at a user level, the kernel level program including instructions for a computer, which when executed causes the computer to carry out actions, comprising:
   decoding encrypted media data to generate raw data, scrambling the raw data to generate scrambled data that is referenced by the application program, and outputting the scrambled data; and
   descrambling the scrambled data to generate the raw data and outputting the raw data to a player,
   wherein the user level application program and the kernel level program are executed on the same user information processor.

* * * * *